United States Patent [19]

Lopez

[11] Patent Number: 4,912,480
[45] Date of Patent: Mar. 27, 1990

[54] OFFSET PHASE-CENTER ANTENNA FOR AIRCRAFT LANDING SYSTEM

[75] Inventor: A. R. Lopez, Commack, N.Y.

[73] Assignee: Hazeltine Corporation, Greenlawn, N.Y.

[21] Appl. No.: 257,375

[22] Filed: Oct. 14, 1988

[51] Int. Cl.$^4$ ............................. G01S 1/16; B64F 1/20
[52] U.S. Cl. .................................... 342/413; 342/412; 350/951
[58] Field of Search ..................... 342/33–35, 342/410–413; 340/951–954; 364/428, 429

[56] References Cited

U.S. PATENT DOCUMENTS

| 3,328,800 | 6/1967 | Algeo | 343/771 |
| 4,371,876 | 2/1983 | Nash | 343/768 |
| 4,811,022 | 3/1989 | Cafarelli et al. | 342/407 |

Primary Examiner—Thomas H. Tarcza
Assistant Examiner—Gregory C. Issing
Attorney, Agent, or Firm—E. A. Onders

[57] ABSTRACT

An azimuthal scanning antenna for an aircraft landing system is formed of a set of vertically disposed columnar radiators arranged side-by-side in a horizontal array. The columnar radiators are tilted back in pitch 7.5°. Individual ones of the radiators are formed of waveguide sections terminated by reflecting end walls. The terminating walls provide for a standing wave of electromagnetic field in response to microwave electromagnetic energy applied to the waveguide section by a feed disposed at or near the bottom of the waveguide section. Slot apertures are disposed along a front wall of each waveguide section, and are oriented at a selected angle relative to a perpendicular relationship to the sidewalls. The orientation of the slots introduces a variation in coupling for illumination of the radiation aperture of the radiator wherein the phase center is offset from a central point towards an upper end of each of the waveguide sections. The sighting of the feed and a phase shifter associated therewith to a point below the top of the waveguide section and the raising of the phase center enables the antenna to increase the height of the source point from which the beam appears to radiate. This provides better clearance of nearby objects, particularly a tower which supports an approach light, without intrusion toward an aircraft glide path. Another important characteristic is the antenna's frequency insensitivity, which provides performance over all MLS frequency channels without requiring mechanical adjustment of the antenna pitch angle.

7 Claims, 4 Drawing Sheets

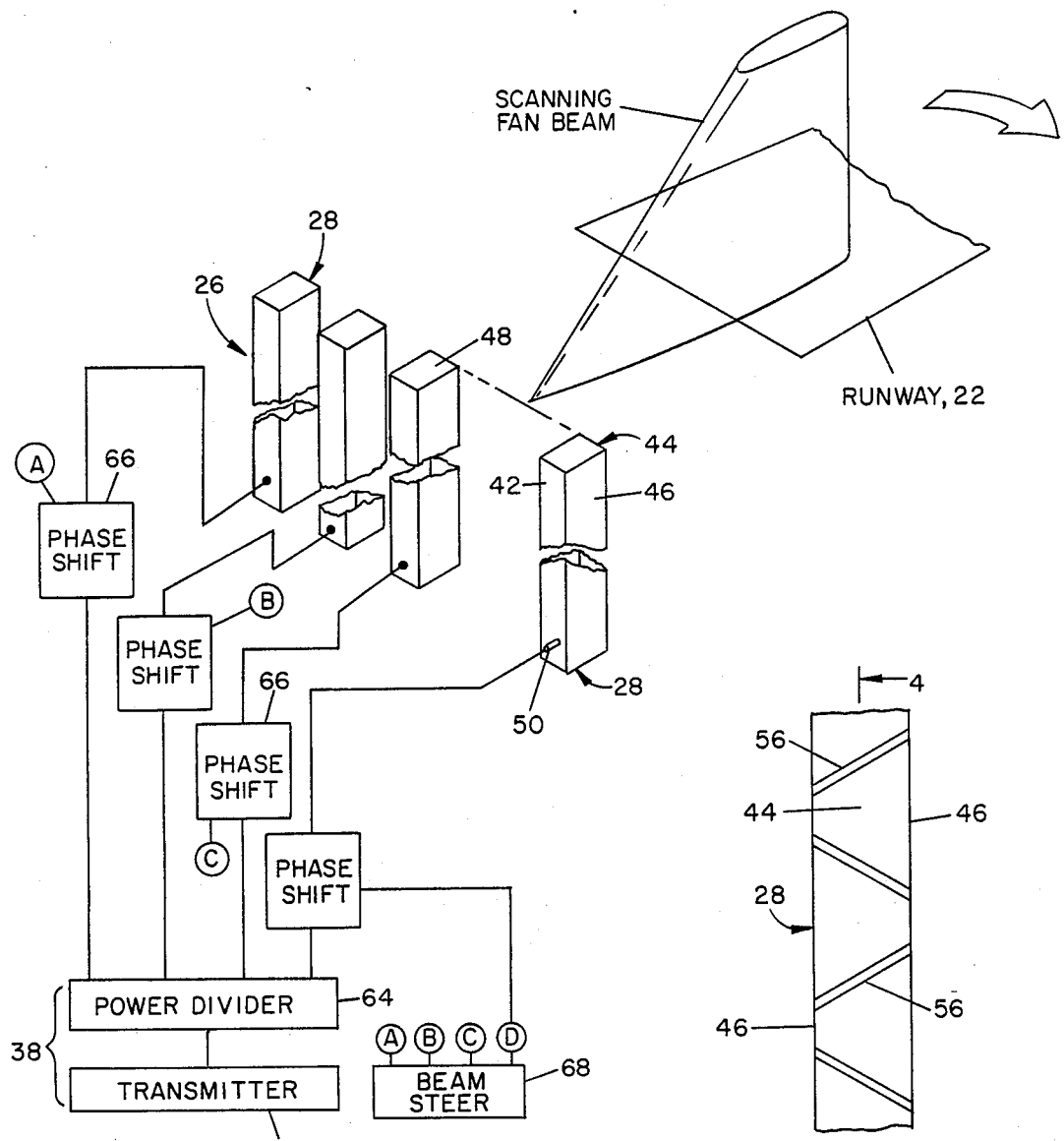
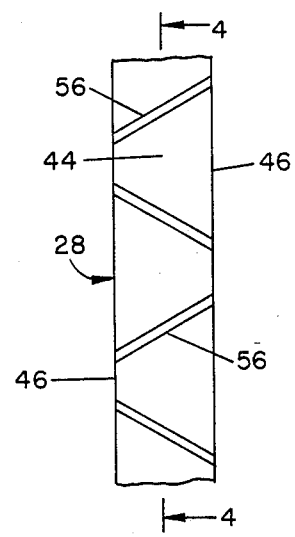
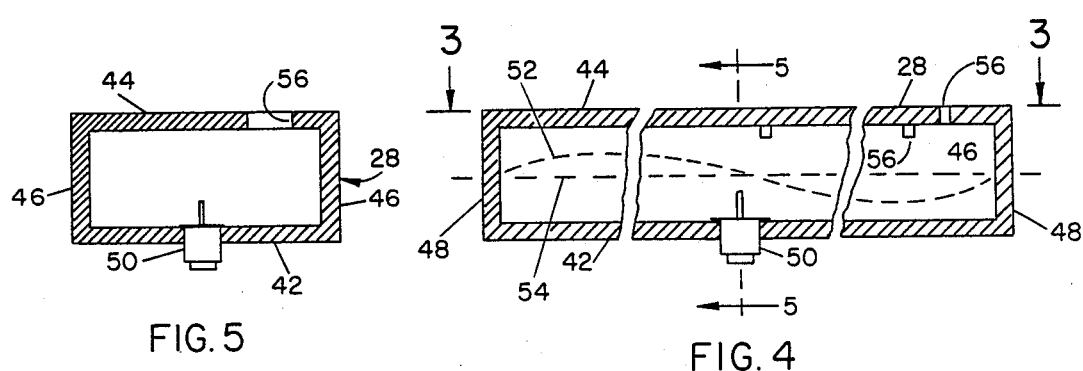
FIG. 2
FIG. 3
FIG. 5
FIG. 4

NOTE; 0 DEGREES = 7.5 DEGREES ELEVATION ANGLE

OFFSET PHASE-CENTER ANTENNA FOR AIRCRAFT LANDING SYSTEM

BACKGROUND OF THE INVENTION

This invention relates to a microwave landing system (MLS) for guiding aircraft to a safe landing at an airport and, more particularly, to a frequency-insensitive scanning-beam antenna which is adapted for inclusion within an array of airport landing lights by use of an offset phase center in an antenna excitation pattern.

Instrument landing systems, particularly microwave landing systems, are employed at airports for guiding aircraft safely to a landing on an airport runway during inclement weather, when visibility is restricted. Generally, an aircraft landing system employs both an electromagnetic guidance beam, transmitted frOm the round and received by the aircraft, and a series of approach lights, arranged typically in an ascending path from the end of the runway, to provide guidance on an inclined approach path, or glide path, which the aircraft is to follow during a landing procedure. The lights provide the pilot of an aircraft with a visual indication of the approach path, while the electromagnetic beam interacts with the receiver on board the aircraft to generate electrical signals which indicate the location of the aircraft relative to the desired approach path. The visual and electrical approach aids cooperate to ensure a safe landing. The electromagnetic beam enables the aircraft to follow the desired approach path at considerable distance from the runway, while the approach lights provide an additional visual aid and reference at relatively short distance from the runway during the final stage of aircraft approach.

Typically, in the construction of a modern MLS, a plurality of electromagnetic guidance beams are generated. One of these beams provides azimuth guidance by means of a vertical fan beam which is scanned to and from in azimuth to provide lateral guidance to orient the approaching aircraft. Of particular interest herein, is the construction of an azimuthal scanning antenna for generating such a horizontally scanned beam.

In a typical landing system, the series of approach lights is located between the near end of the runway and the approaching aircraft, while the guidance beam antenna is located beyond the far end of the runway. This arrangement of lights and antenna permits the electromagnetic beam to interact with the aircraft receiver even when the aircraft is flying above the runway immediately before touchdown. Both the guidance beam antenna and the set of approach lights are located along the runway axis.

However, to enable landings to be accomplished in either direction along a runway landing lights and guidance antennas are located at both ends of the runway. In this case, a problem arises in that the guidance-beam antenna used for guiding the aircraft in landing at one end of the runway must be located within the array of approach lights, and their supporting posts or towers, used in landing at the other end of the runway. As is well known, the supporting posts of the lights are typically relatively low near the end of the runway, so as to define a glide path for approaching aircraft. The placement of a guidance-beam antenna among the light-support posts is constrained by a restriction on the maximum height of the antenna. The antenna should not block any lights, nor be higher than an obstruction surface which is defined with respect to the light plane within the approach path. On the other hand, the presence of a nearby support post tends to perturb radiation from the antenna, particularly when the guidance beam is directed along the runway.

It has been the practice in the construction of a MLS to employ an array of columnar antenna element, arranged side-by-side, wherein each antenna element is a slotted waveguide with radiation emanating from a set of slot apertures on a front wall of each waveguide. Each waveguide supports a traveling wave, and is energized by a feed and phase shifter at the top of the waveguide. This exacerbates the foregoing problem by adding increased height to the antenna. Furthermore, the construction of the antenna with waveguide that employ traveling waves introduces a frequency dependence in the operation of the antenna, because the succession of slots along each waveguide functions as an array of slot radiators, introducing a predetermined elevation angle of radiation from each waveguide. The radiation beam squints in elevation as a function of frequency because the guide wavelength changes with frequency while the positions of the slots remain fixed. As a result, it has been necessary to mechanically tilt the array of columnar radiators to accomodate signal transmissions to the aircraft at different radiation frequencies to ensure that the radiated signals are directed in a desired elevation angle for reception by the aircraft. The frequency sensitivity, therefore, has necessitated undesirable increased complexity to the MLS antenna apparatus.

It is, therefore, an object of the present invention to provide new and improved antennas useful in aircraft landing systems.

It is another object of the present invention to provide new and improved aircraft landing systems wherein the guidance antennas are colocated with the guidance lights.

It is still another object of the present invention to provide new and improved waveguide radiator for use in an aircraft landing system, wherein said radiator employes a standing wave, a rear wall or bottom end feed and an offset phase center.

SUMMARY OF THE INVENTION

The foregoing problem is overcome and other advantages are provided by a construction of the azimuthal scanning antenna, in accordance with the invention, wherein the antenna is constructed of a set of vertically disposed waveguide sections, positioned in a side-by-side array, and energized individually by a feed located on the back wall or the bottom end of each waveguide section. Positioning the feeds near or at the bottom, rather than the top, of the waveguide, as has been done heretofore, reduces the overall height of the antenna structure so as to permit a raising of the radiation aperture without protrusion toward the aircraft glide path.

In the array of columnar radiators, each of the waveguide sections is provided with reflecting end walls which induce the formation of a standing wave of electromagnetic energy. The location of nodes and antinodes in the standing wave is a function of the geometry of the waveguide section and, within the radiation bandwidth, the phase within a cell defined by two nodes is independent of the frequency of the electromagnetic energy. A front wall of each of the waveguide sections is provided with a set of slot apertures, inclined with respect to a perpendicular relationship from the sidewalls, thereby to interact with a longitudinal magnetic field of the standing wave. The inclination of alternate ones of the slot apertures is reversed to compensate for reversals in the direction of the magnetic field from one antinode to the next antinode.

In accordance with a further feature of the invention, the inclination of the slot apertures is varied to provide for a validation in coupling of electromagnetic power to each of the apertures. The variation is selected to provide for a coupling profile in which the illumination of the radiating aperture of the columnar radiator varies in accordance with a modified (sin x)/x pattern. Furthermore, the peak value of the aperture illumination is offset from the center of a waveguide section towards one end of the waveguide section, thereby to accomplish an offsetting of the phase center of the aperture illumination toward the upper end of a waveguide section. This has the advantageous result of raising the apparent source point (phase center) from which a beam appears to radiate from the antenna. The raising of the source point enables the antenna to generate, more readily, a beam which can clear a nearby object, particularly the structure which supports approach lights.

Both of the foregoing features, namely, elevation of the radiating apertures by bottom feeding (instead of top feeding) the waveguide section and offsetting the phase center of the illumination profile, increase the capacity of the antenna to clear a nearby object during the generation of a beam of radiation. As a result, antennas which embody the invention can generate more accurate azimuth guidance when constrained by the approach light lane obstruction surface.

BRIEF DESCRIPTION OF THE DRAWINGS

FIG. 2 is a stylized view, partially in perspective view and partially in diagrammatic form, of an azimuthal beam scanning antenna of FIG. 1, the antenna comprising a set of vertical columnar radiators.

FIG. 3 is a fragmentary view of a front surface of a radiator of FIG. 2.

FIG. 4 is a longitudinal sectional view, taken along the line 4—4 of FIG. 3, of a radiator of FIG. 1.

FIG. 5 is a transverse sectional view of the radiator of FIG. 4, taken along the line 5—5 in FIG. 4.

DESCRIPTION OF THE INVENTION

Figure 1:
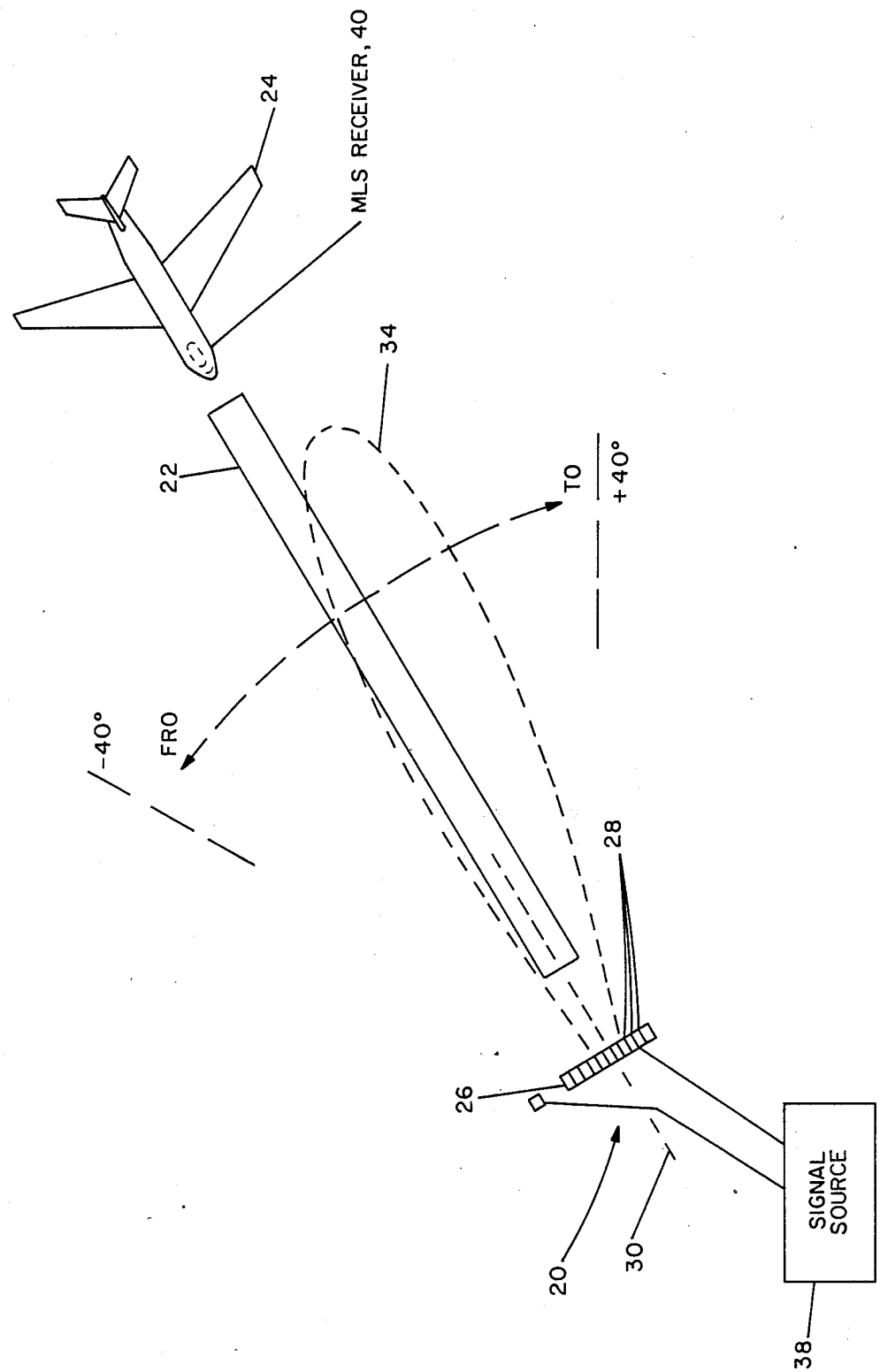
FIG. 1 is a stylized diagrammatic view of an aircraft landing on a runway with guidance from a swept electromagnetic beam.

FIG. 1 shows an aircraft landing system 20 located at a runway 22 for guiding an incoming aircraft 24 to a safe landing on runway 22. Preferably, system 20 is a microwave landing system MLS). System 20 includes a phased array antenna 26 comprising a linear array of antenna elements 28 located beyond the far end of the runway 22 and oriented perpendicularly to a longitudinal axis 30 of the runway. Antenna 26 is centered on the axis 30 for generating a guide beam 34 which sweeps to and fro symmetrically about axis 30. A sector antenna 36 transmits a data signal towards aircraft 24. Signals transmitted by antennas 26 and 36 are generated by a ground-based signal source 38, and are received by an airborne receiver 40 carried by aircraft 24.

FIGS. 2-7 show details of the construction of azimuthal scanning antenna 26 in accordance with the invention. In antenna 26, elements 28 are columnar radiators, oriented vertically in a side-by-side array. Each element 28 is formed of a section of waveguide of rectangular cross-section. The section of waveguide for each of the column radiators has the sam shape and physical dimensions, and Comprises a back wall 42 and a frOnt wall 44 joined by sidewalls 46. While various ratios of width of sidewall to front wall may be employed, in the preferred embodiment of the invention, the ratio is 2:1. Ends of the waveguide section are terminated with reflecting walls 48. All of the walls are made of electrically conductive material, preferably a metal such as aluminum.

Each element 28 is provided with a feed 50 located in the back wall 42 for generating a transverse electric (TE) wave within element 28, the wave being a standing wave 52 (FIG. 4) with nodes and antinodes arranged serially along an axis 54 of element 28, with a spacing dependent on the distance between the reflecting end walls 48. It should be noted that the spacings of the nodes and the antinodes of the standing wave are determined by the geometry of the waveguide, and, within the bandwidth of radiation of the columnar radiator, element 28 operates independently of frequency. Slot apertures 56 are formed in the front wall 44 of each element 28, and are located serially along the waveguide section at the sites of the antinodes of the electric field in the standing electromagnetic wave 52. The slot apertures 56 are inclined relative to the sidewalls 46 so as to interact with the magnetic fields which are oriented longitudinally parallel to the longitudinal axis 54 of the waveguide section of each element 28. Since the electric fields alternate in phase with successive antinodes, the angle of inclination of successive ones of the slot apertures 56 is reversed so as to provide the required phase, 0° or 180°, for the desired modified (sin x)/x aperture illumination. A typical arrangement in accordance with the present invention is presented in the following table:

TABLE

| SLOT NO. | SLOT LOCATION (WAVELENGTHS) | AMPLITUDE (−DB) | PHASE (DEGREES) |
| --- | --- | --- | --- |
| 1 | 0.000 | 5.500 | 180 |
| 2 | 0.734 | 17.840 | 180 |
| 3 | 1.468 | 25.120 | 0 |
| 4 | 2.202 | 10.540 | 0 |
| 5 | 2.936 | 5.100 | 0 |
| 6 | 3.670 | 2.090 | 0 |
| 7 | 4.404 | 0.500 | 0 |
| 8 | 5.138 | 0.000 | 0 |

TABLE-continued

| SLOT NO. | SLOT LOCATION (WAVELENGTHS) | AMPLITUDE (−DB) | PHASE (DEGREES) |
|---|---|---|---|
| 9 | 5.872 | 0.500 | 0 |
| 10 | 6.606 | 2.090 | 0 |
| 11 | 7.340 | 5.100 | 0 |
| 12 | 8.074 | 10.540 | 0 |
| 13 | 8.808 | 25.120 | 0 |
| 14 | 9.542 | 17.840 | 180 |
| 15 | 10.276 | 12.830 | 180 |
| 16 | 11.010 | 12.440 | 180 |
| 17 | 11.744 | 15.200 | 180 |
| 18 | 12.478 | 23.950 | 180 |
| 19 | 13.212 | 25.390 | 0 |
| 20 | 13.946 | 16.960 | 0 |
| 21 | 14.680 | 15.070 | 0 |
| 22 | 15.414 | 16.440 | 0 |
| 23 | 16.148 | 22.350 | 0 |
| 24 | 16.882 | 33.820 | 180 |
| 25 | 17.616 | 19.420 | 180 |
| 26 | 18.350 | 16.190 | 180 |
| 27 | 19.084 | 16.500 | 180 |
| 28 | 19.818 | 20.610 | 180 |
| 29 | 20.552 | 45.610 | 180 |
| 30 | 21.286 | 21.470 | 0 |
| 31 | 22.020 | 16.210 | 180 |

Figure 8:
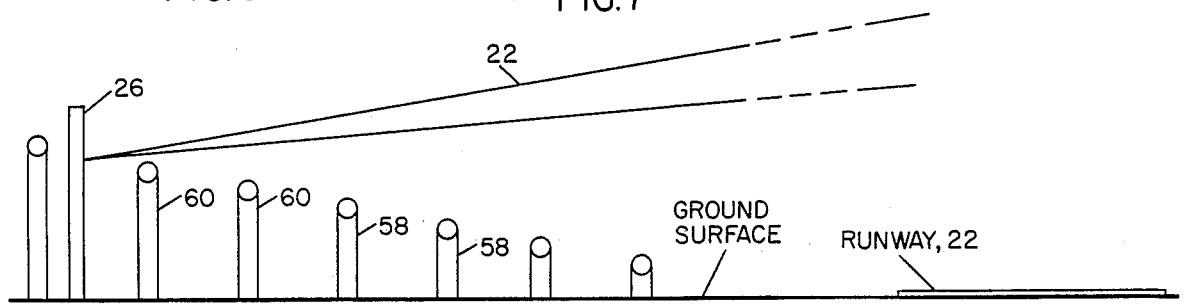
FIG. 8 shows an arrangement of approach light towers at an end of a runway and also includes the scanning antenna of FIG. 2, shown in side view, disposed alongside a light tower.
Figure 9:
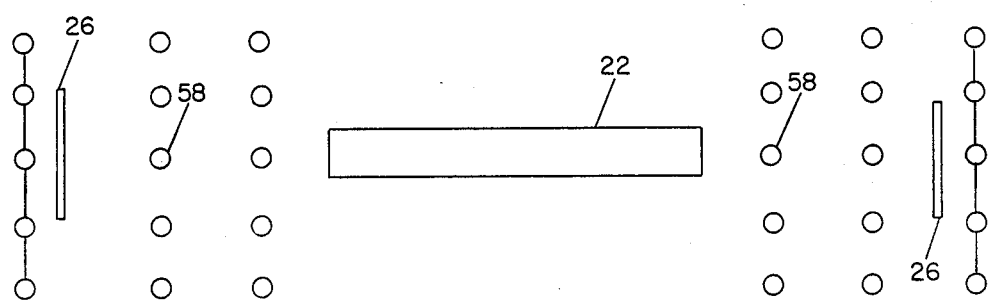
FIG. 9 shows a symmetric array of approach lights and guidance antennas positioned at opposite ends of a runway.
Figure 10:
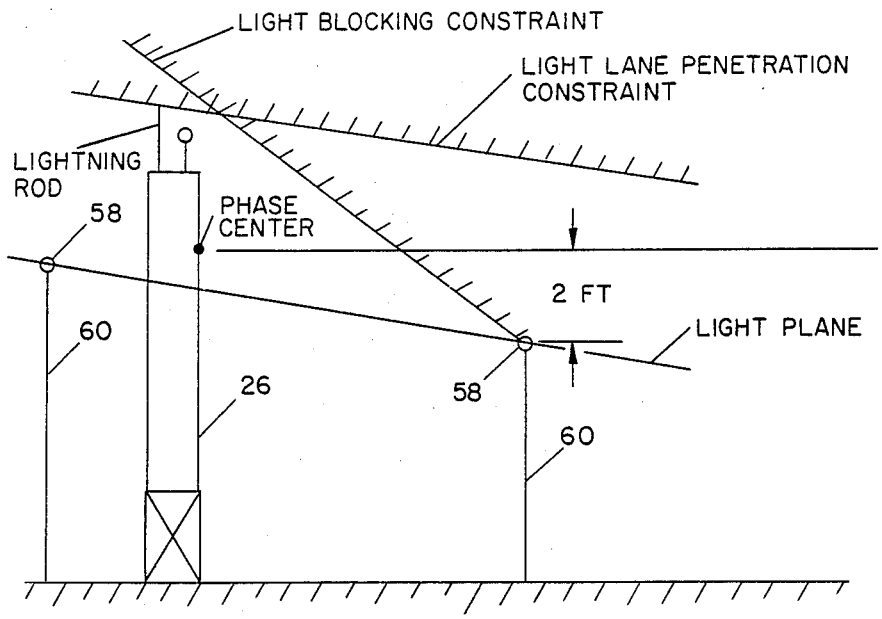
FIG. 10 shows a portion of the arrangement of FIG. 8 in greater detail

As shown in FIGS. 8, 9 and 10, a pair of the antennas 26 is generally employed with a single runway 22, one antenna being placed at a first end of the runway and a second antenna being placed at a second end of the runway. The antennas 26 are spaced back away from the respective ends of the runway 22 by a sufficient distance to clear the glide path of incoming aircraft. As an additional aid for the guiding of aircraft in inclement weather, it is common practice at airports to install a sequence of approach lights 58 mounted on pedestals or towers 60 typically at ever increasing heights with increasing distance from the runway 22. FIG. 9 has been simplified to show only a few lights 58. The locus of the lights at either end of the runway 22 is typically an inclined line situated below, the aircraft glide slope as shown in FIG. 10.

It is convenient to locate each of the antennas 26 within the array of light towers 60 at opposite ends of the runway 22. Typically, an antenna 26 is mounted adjacent a light tower 60 so as to allow for maximum height of the antenna 26 without protrusion into the light lane penetration surface. Antenna 26 is mounted on the side of the selected light tower 60 facing the runway 22, and radiates the beam 22 at a slight elevation angle which clears the tower 60 next closest to runway 22. The geometric arrangement of the light towers 60 and the light lane penetration surface severely limits the placement of antenna 26 and the minimum angle of elevation of radiation from the antenna 26 to clear the next light tower 60.

In accordance with a feature of the invention, the constraints of the foregoing geometry of the light towers 60 and the glide path are relaxed as a result of the invention by configuring antenna 26 with a radiation aperture which extends to the top of the structure of the antenna 26 without the need for any feed structure or phase shifter structure above the antenna. Such feed and phase shifter structures have, heretofore, been placed on the top end of the columnar radiators and, in order to prevent protrusion into the glide path, have necessitated a reduction in height of the radiating aperture of the antenna. The invention avoids this problem by feeding each waveguide section of each element 28 by means of the foregoing feed 50, which is located toward the bottom of the back wall 42 of element 28, at a site well below the top of element 28, or in the bottom end of element 28.

In accordance with a further feature of the invention, the constraints of the foregoing geometry of light towers and antennas are further relaxed by elevating the effective center of radiation o each antenna, more specifically the phase center of the aperture illumination function of each columnar radiator. This is accomplished by altering the angles of inclination of the respective slot apertures 56 to provide for varying amounts of coupling between each slot aperture 56 and the standing electromagnetic wave 52 within the element 28. The coupling provides for a modified (sin x)/x illumination taper wherein x (FIG. 7) is distance along the waveguide axis 54. In addition, instead of positioning the coordinate axes at the center of the element 28 which provides a phase center at the center of the waveguide radiator, the coordinate axis defining the distance x is offset toward the upper end of the waveguide section 28 to produce a desired offset phase center to the illumination. Therefore, the radiation from each columnar radiator appears to emanate from a location near the top of the radiator, rather than from the center of the radiator. By elevating the phase center, and thereby lifting the apparent source of the radiation at each columnar radiator, the beam of radiation produced by antenna 26 has better clearance over the adjacent light tower 60 that is closer to the end of the runway as shown in FIG. 10. This permits greater flexibility in the siting of the array antenna.

Figures 6, 7:
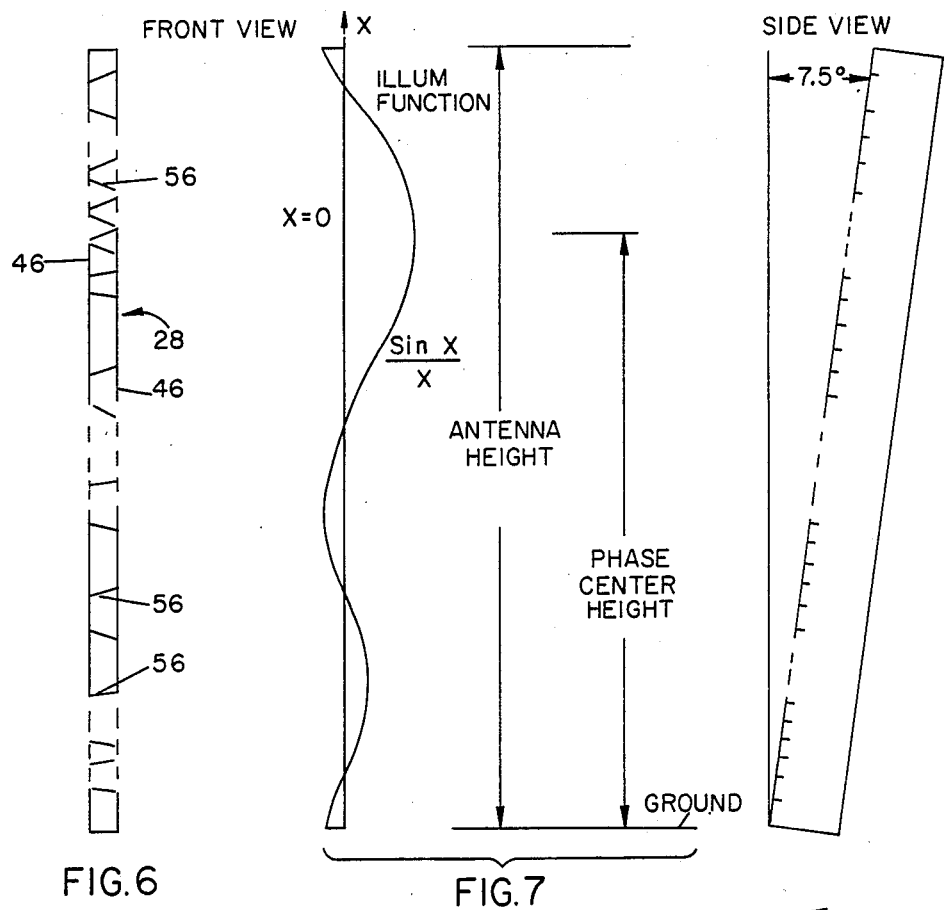
FIG. 6 is a stylized view of a radiator of FIG. 2 showing a front surface thereof diagrammatically, the view of the front surface indicating changing angles of inclination of slot apertures to provide a varying illumination function.
FIG. 7 is drawn in registration with FIG. 6, and shows a generalized representation of an illumination function for the radiator of FIG. 6, the illumination function providing an increased phase center height.
Figure 11:
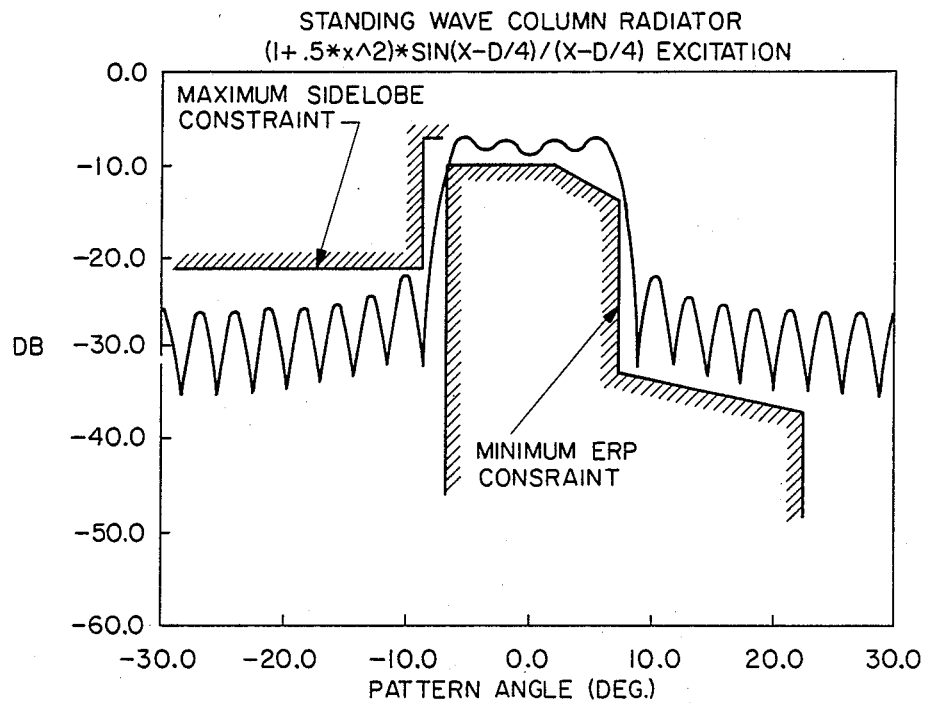
FIG. 11 illustrates a typical vertical plane radiation pattern for antennas which embody the present invention.

The top of the waveguide radiator 28 is tilted back 7.5° in the vertical plane, as shown in FIG. 7, to center the sector pattern between the 0° and 15° elevation angles as shown in the vertical plane radiation pattern of FIG. 11. Further information concerning the construction of a slotted apertured waveguide supporting a standing wave is disclosed in U.S. Pat. No. 4,554,550 issued in the name of Alfred Lopez on Nov. 19, 1985, and assigned to Hazeltie Coproration, the assignee herein.

Referring to FIGS. 1 and 2, signal source 38 comprises a transmitter 62 and a power divider 64 for applying electromagnetic signals to the antenna elements 28. Signal power generated in the transmitter 62 is divided among the various elements 28 by divider 64. Connection between output ports of the divider 64 and feeds 50 of the respective elements 28 is accomplished via phase shifters 66. These phase shifters are mounted behind the elements 28 so as to minimize the overall height of the structure of the antenna, feeds and phase shifters. It is also possible to mount the phase shifters directly to the bottom of the columnar radiators. Phase shifters 66 are controlled by signals from a beam steering unit 68 which operates in well-known fashion to shift the phases of signals radiated by the respective antenna elements 28 for the generation of a beam 22 and for the scanning of beam 22. A suitable vertical plane radiation pattern for beam 22 is shown in FIG. 11. By way of example, four elements 28 are shown, and four output terminals A-D of the steering unit 68 are connected to corresponding control signal inputs of phase shifters 66.

It should be noted that the invention not only places electronic drive circuitry behind or below the antenna elements for reduction of overall height of the antenna structure, but also provides frequency-independent operation of the antenna, allowing all frequency channels to be transmitted through the same beam in the same beam direction, and elevates the phase center of illumination of the radiating aperture of each antenna element. This attains better clearance of obstructions at an airport for safer and more accurate guidance of aircraft.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An antenna for generating a guide beam in an aircraft landing system, said antenna comprising
   an array of columnar radiators, each of the column radiators being an elongated waveguide, there being a set of slot apertures disposed in a wall of said waveguide and being angled relative to sidewalls of said waveguides top provide for predetermined values of coupling coefficient, each of said waveguides having reflective end walls to provide for a standing wave pattern within each waveguide, said standing wave pattern having a frequency-independent phase at predetermined locations along a longitudinal axis of respective ones of said waveguides; and wherein
   an excitation pattern in each of said waveguides is in the form of a modified ratio of (sin x) divided by x, wherein x is distance along the longitudinal axis of a waveguide, the columnar radiators being arranged side-by-side;
   a phase center of the excitation in each radiator is offset toward an upper end of the waveguide for improved ground clearance; and
   each of said waveguides is provided with a feed for receiving electromagnetic power, the feed in each waveguide being located at a point below the highest one of said apertures to minimize the height of each waveguide while retaining the length of a radiating aperture in each waveguide.

2. An antenna according to claim 1 wherein:
   each of said waveguides comprises broad sidewalls Joined by narrow walls, the width of a broad wall being approximately twice the width of a narrow wall, said slotted apertures being disposed within a narrow wall in each of said waveguides, the feed exciting a transverse-electric mode of excitation in a waveguide, with the electric field being disposed parallel to a plane defined by the wall having said set of apertures.

3. An antenna system for generating a guide beam in a aircraft landing system, said antenna system comprising:
   an array of column radiators, each of the column radiator being an elongated waveguide, there being a set of slot apertures disposed in a wall of said waveguides and being angled relative to sidewalls of said waveguides to provide for predetermined values of coupling coefficient, each of said waveguides having reflective end walls to provide for a standing wave pattern within each waveguide, said standing wave pattern having a frequency-independent set of nodes disposed at predetermined locations along a longitudinal axis of respective ones of said waveguides; and wherein
   an excitation pattern in each cf said waveguides is in the form of a modified ratio of (sin x) divided by x, wherein x is distance along the longitudinal axis of a waveguide, the column radiators being arranged side-by-side;
   a phase center of the excitation in each radiator is offset toward an upper end of the waveguide for improved ground clearance; and
   each of said waveguides is provided with a feed for receiving electromagnetic power, the feed in each waveguide being located at a point below the highest one of said apertures to minimize the length of each waveguide while retaining the length of a radiating aperture in each waveguide; said system further comprising
   scanning means including phase shifters connected to respective ones of said column radiators for altering the phase of radiation from one of said column radiators relative to other ones of said column radiators, thereby to accomplish a steering of a beam of radiation emanating from said radiators, and wherein,
   in each of said waveguide, said feed couples electromagnetic power from a corresponding one of said sifters to the waveguide.

4. A system according to claim 3 wherein each of said waveguides is formed of broad sidewalls joined by narrow walls, the width of a broad wall being approximately twice the width of a narrow wall, said slotted apertures being disposed in a narrow wall in each of said waveguide, the feed exciting a transverse-electric mode of excitation in a waveguide, with the electric field being disposed parallel to a plane defined by the wall having said set of apertures.

5. In an airport landing system having typically an ascending array of approach guidance lights and antenna apparatus which generates an electromagnetic guidance beam, the guidance lights and the antenna apparatus being oriented relative to a runway axis for guiding aircraft to land on the runway, the system comprising:
   a set of guidance lights mounted on a set of supports of differing heights, each support supporting one or more of said lights, the supports being arranged along a line parallel to the runway axis at an end of the runway with typically monotonically increasing heights with increasing distance from the runway;
   said antenna apparatus including an antenna disposed between successive ones of said supports and being oriented for directing a beam of electromagnetic energy in a direction toward the shorter one of said supports; and wherein
   said antenna comprises an array of columnar radiators, each of the columnar radiators being an elongated waveguide having a set of slot apertures disposed int he front wall thereof and being angled relative to the sidewalls of said waveguide to provide for predetermined values of coupling coefficient, said waveguides having reflective end walls to provide for a standing wave pattern within each waveguide, said standing wave pattern having a frequency-independent phase between a pair of nodes disposed at predetermined locations along the longitudinal axes of respective ones of said waveguides; and wherein
   an excitation pattern in each of said waveguides is in the form of a modified ratio of (sin x) divided by x, wherein x is distance along the longitudinal axis of a waveguide, the columnar radiators being arranged side-by-side; and wherein as a result of said values of coupling coefficients a phase center of the excitation in each waveguide is elevated by a predetermined height, said height being approximately equal to the height of said shorter support to enable an electromagnetic beam to clear the shorter support for reception by an approaching aircraft;

means for scanning azimuthally a guidance beam radiated by said antenna, said scanning means including phase shifters coupled to respective ones of said waveguides for altering the phase of radiation from one of said waveguides relative to other ones of said waveguides, thereby to accomplish steering of a beam of radiation emanating from said antenna, and wherein each of said waveguides is provided with a feed for coupling of electromagnetic power from one of said phase shifters to a corresponding waveguide, the feed in each waveguide being located at a point below the highest one of said apertures.

6. A system according to claim 5 wherein each of said waveguides is formed with broad sidewalls and a narrow walls joining the broad sidewalls, the width of a broad wall being approximately twice the width of a narrow wall, said slotted apertures being located in a narrow wall in each of said waveguides, the feed exciting a transverse-electric mode of excitation in a waveguide with the electric field being disposed parellel to a plane defined by the narrow wall having said set of apertures therein.

7. A microwave radiator, comprising:

an elongated waveguide formed of a front wall, back wall, and two sidewalls joining said front wall and said back wall, said waveguide terminating in reflecting end walls;

a set of slot apertures disposed in said front wall, said apertures being angled relative to said sidewalls with varying magnitudes of angle to provide for a variation in coupling of electromagnetic power from within said waveguide in accordance with an excitation pattern in the form of a modified ratio of (sin x) divided by x, where x is distance along the longitudinal axis of said waveguide, said pattern having a maximum intensity of illumination bounded by regions of reduced illumination intensity, the maximum intensity being offset from a central part of the waveguide toward an end region of the waveguide; and a feed disposed in said rear wall for applying electromagnetic power to said waveguide, said feed exciting a standing wave within said waveguide, with electric field parallel to said front wall.

* * * * *